United States Patent
Obligacion

(10) Patent No.: US 10,057,370 B2
(45) Date of Patent: Aug. 21, 2018

(54) TEAM PROCESSING USING DYNAMIC LICENSES

(75) Inventor: Eric T. Obligacion, Annandale, VA (US)

(73) Assignee: UNISYS CORPORATION, Blue Bell, PA (US)

( * ) Notice: Subject to any disclaimer, the term of this patent is extended or adjusted under 35 U.S.C. 154(b) by 352 days.

(21) Appl. No.: 13/604,725

(22) Filed: Sep. 6, 2012

(65) Prior Publication Data
US 2014/0068041 A1 Mar. 6, 2014

(51) Int. Cl.
*H04L 29/08* (2006.01)
*G06F 21/10* (2013.01)

(52) U.S. Cl.
CPC ............ *H04L 67/32* (2013.01); *G06F 21/105* (2013.01)

(58) Field of Classification Search
CPC ............................... H04L 67/32; G06F 21/105
See application file for complete search history.

(56) References Cited

U.S. PATENT DOCUMENTS

| | | | | |
|---|---|---|---|---|
| 6,842,896 B1 * | 1/2005 | Redding | ................ | G06Q 10/10 713/155 |
| 8,533,103 B1 * | 9/2013 | Certain | .................. | G06Q 10/06 705/35 |
| 9,430,280 B1 * | 8/2016 | Shih | ........................ | G06F 9/485 |
| 9,444,717 B1 * | 9/2016 | Aithal | ................. | H04L 41/0896 |
| 9,479,382 B1 * | 10/2016 | Ward, Jr. | ................... | G06F 9/50 |
| 2002/0022971 A1 * | 2/2002 | Tanaka | ..................... | G06F 21/10 705/26.1 |
| 2002/0107809 A1 * | 8/2002 | Biddle | ................... | G06Q 10/10 705/59 |
| 2003/0028622 A1 * | 2/2003 | Inoue | .................. | G06F 21/6218 709/219 |
| 2003/0126456 A1 * | 7/2003 | Birzer | ................. | G05B 19/042 713/193 |
| 2004/0010469 A1 * | 1/2004 | Lenard | .................... | G06F 21/10 705/51 |
| 2004/0168061 A1 * | 8/2004 | Kostal | ..................... | G06F 21/10 713/170 |
| 2004/0172367 A1 * | 9/2004 | Chavez | ................ | G06Q 10/087 705/59 |
| 2005/0132347 A1 * | 6/2005 | Harper | ................... | G06F 21/105 717/168 |
| 2006/0152756 A1 * | 7/2006 | Fellenstein | ............ | G06Q 40/04 358/1.15 |
| 2006/0212334 A1 * | 9/2006 | Jackson | ................ | G06F 9/5027 709/226 |
| 2007/0033395 A1 * | 2/2007 | MacLean | ................ | G06F 21/10 713/157 |
| 2008/0300844 A1 * | 12/2008 | Bagchi | ................... | G06Q 10/06 703/13 |

(Continued)

*Primary Examiner* — Philip Chea
*Assistant Examiner* — Wuji Chen

(57) ABSTRACT

Devices may be grouped into teams by a team identifier configured for each device. Within the team, one device may be selected as a control device for handling requests made to the team. A team address is assigned to the team for directing communications from the client. The control device parses messages addressed to the team address and forwards requests to slave devices in the team. The control device may perform load balancing of the slave devices when directed messages to the slave devices. Device teams may be used to assign dynamic licenses to the clients.

18 Claims, 8 Drawing Sheets

(56) References Cited

U.S. PATENT DOCUMENTS

| | | | | |
|---|---|---|---|---|
| 2008/0313264 A1* | 12/2008 | Pestoni | .................... | G06F 21/10 |
| | | | | 709/202 |
| 2009/0119779 A1* | 5/2009 | Dean | ..................... | G06F 21/105 |
| | | | | 726/26 |
| 2010/0058347 A1* | 3/2010 | Smith | ........................ | G06F 9/50 |
| | | | | 718/104 |
| 2010/0088750 A1* | 4/2010 | Okamoto | ................. | G06F 21/10 |
| | | | | 726/4 |
| 2010/0211945 A1* | 8/2010 | Doui | ..................... | G06F 21/121 |
| | | | | 717/176 |
| 2012/0016721 A1* | 1/2012 | Weinman | ............... | G06Q 10/06 |
| | | | | 705/7.35 |
| 2012/0131591 A1* | 5/2012 | Moorthi | ................. | G06Q 10/06 |
| | | | | 718/104 |
| 2012/0198462 A1* | 8/2012 | Cham | .................... | G06F 9/5038 |
| | | | | 718/103 |
| 2013/0246208 A1* | 9/2013 | Jain | ........................... | G06F 9/50 |
| | | | | 705/26.3 |
| 2013/0326637 A1* | 12/2013 | Fang | ..................... | G06F 21/105 |
| | | | | 726/28 |
| 2016/0226955 A1* | 8/2016 | Moorthi | ................. | G06Q 10/06 |

\* cited by examiner

TEAM PROCESSING USING DYNAMIC LICENSES

FIELD OF THE DISCLOSURE

The instant disclosure relates to network devices. More specifically, this disclosure relates to improving the resiliency of network devices.

BACKGROUND

Computer networks have become backbones of companies throughout the world. Even if a company does not provide products or services over the internet, computer networks within the company improve employee productivity by providing employees with instantaneous access to millions of bytes of data. In fact, many companies are unable to function when the company's computer network fails. Thus, it is imperative that companies have reliable computer networks with 99.999% up time.

Conventionally, devices on a computer network function independently of each other. For example, a server may respond to requests from a client. However, if the server fails, then the client may lose access to the functionality hosted by the server. In one conventional solution, the client may be configured with addresses for a primary and a secondary server. If the client loses communication with the primary server, then the client may communicate with the secondary server to prevent loss of the functionality provided by the primary server. However, a separate configuration of each client device for each primary and secondary server is still required. This creates additional overhead in the administration of the clients. Further, there are only a finite number of configured servers for any client. That is, because the configuration data is static, the client cannot adapt quickly to failures in the network even though other resources may be available. Thus, the possibility of a failure of the primary and secondary servers that results in a loss of functionality for the client still exists.

SUMMARY

Device teaming allows several devices to operate together to deliver increased license capacity to clients of the devices, load balancing to improve responsiveness to clients of the devices, and failover capability to maintain service to clients of the devices during failures of devices in the team. One device in the team may assume control over devices in the team. The control device may respond to messages sent to the team on behalf of the team. The control device may respond to messages by identifying available licenses on devices within the team and sending messages to those devices. The control device may also pass requests along to slave devices to respond to the requests. A device may determine whether to assume control of the team by searching for other team members at initialization of the device. When no other team members are online, the device may assume control of the team. Device teams may be useful for networks implementing dynamic licensing.

According to one embodiment, a method includes initializing, by a device, communication on a network. The method also includes searching for at least one other device on the network having a team identifier similar to that of the device. The method further includes, when no team member is identified on the network, assuming control of assigning dynamic licenses from the team. The method also includes, when at least one other team member is identified on the network, receiving dynamic license requests from the at least one other team member.

According to another embodiment, a computer program product includes a non-transitory computer readable medium having code to initialize, by a device, communication on a network. The medium also includes code to search for at least one other device on the network having a team identifier similar to that of the device. The medium further includes code to, when no team member is identified on the network, assume control of assigning dynamic licenses from the team. The medium also includes code to, when at least one other team member is identified on the network, receive dynamic license requests from the at least one other team member.

According to yet another embodiment, an apparatus includes a memory configured to store a team identifier, a network interface, and a processor coupled to the memory and to the network interface. The processor is configured to initialize communication on a network through the network interface. The processor is also configured to search for at least one other device on the network having the team identifier. The processor is further configured to, when no team member is identified on the network, assume control of assigning dynamic licenses from the team. The processor is also configured to, when at least one other team member is identified on the network, receive dynamic license requests from the at least one other team member.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
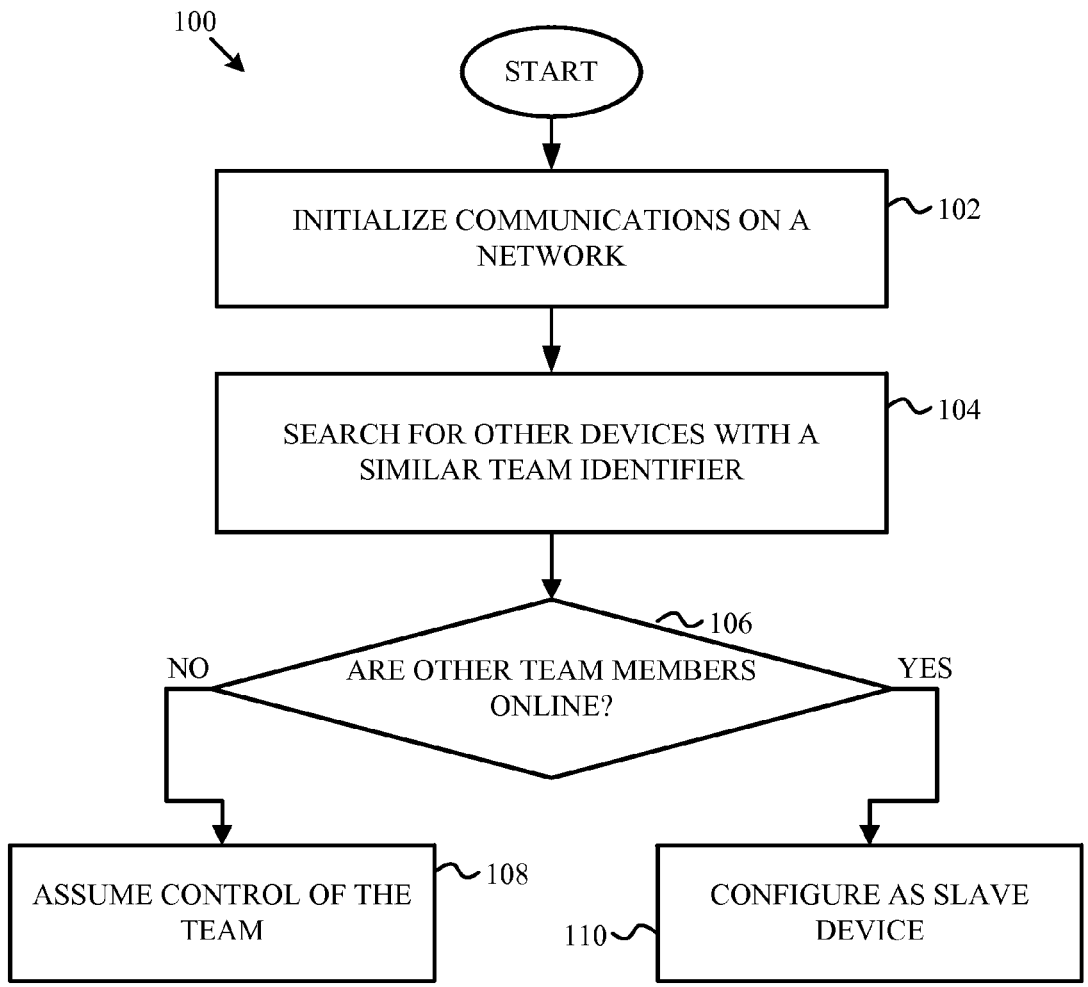
FIG. 1 is a flow chart illustrating a method of configuring devices for operation within a team according to one embodiment of the disclosure.

FIG. 1 is a flow chart illustrating a method of configuring devices for operation within a team according to one embodiment of the disclosure. A method 100 begins at block 102 with a device initializing communications on a network. Initialization may include a device powering up, booting from a read-only memory (ROM) in the device, loading a configuration file from a non-volatile memory in the device, and/or other start-up tasks. The method 100 continues to block 104 with searching for other devices that are assigned to the same team as the device initializing at block 102. For example, the device may search for other devices on the network with a similar team identifier as the device. At block 106, the device determines whether other team members are online. If so, the device configures itself as a slave device at block 110. According to one embodiment, the first device of a team to initialize assumes control of the team. Thus if no other devices in the team are online, the device configures itself as a control device at block 108.

Although the method 100 demonstrates the first device of a team initializing as taking control of the team, other criteria may be used for determining when a device is a control device. For example after determining that other team members are online at block 106 and before configuring as a slave device at block 110, the device may determine if it has a higher assigned priority than the currently assigned control device for the team. If the device initializing at block 102 has a higher priority for acting as control device, then the device may assume control of the team despite other team members being online. Additional criteria may be used as well, such as hardware capability of each device in the team that is online at the time of initialization at block 102. In another example, a unique identifier, such as an intra-team identifier described below may be used to determine which device acts as a control device.

Teams may be configured even when only a single device is a part of the team. This allows for a simpler process when migrating from a single device to teamed devices or vice versa, because reconfiguration of devices may be reduced or eliminated. Further, additional devices may be added to the team without interruption to the device. For example if a reboot is part of a reconfiguration process, the original device may be rebooted to allow reconfiguration of the device to join a team.

To configure a team of one device, one address may be used when creating a team and a second address may be used when adding the device to the team. Although there is only one device in the team, a separate device address and team address may be assigned to the device. The addresses may be, for example, internet protocol (IP) addresses. The device address may be used to individually address the device separate from the team. For example, when a control device and a slave device exist, the control device may use the slave device's address to communicate directly with the slave device. The Team IP Address may be a virtual IP address configured for communicated with a team. Each device in the same team may be assigned the same team IP address. The team IP Address may be used as an address for communicating with the team, when communications with a particular device in the team is not necessary. For example, if a client requests a dynamic license from a team, the client may address the request to the team IP address, to which one of the devices of the team may respond.

To migrate a stand-alone device to join a team, the address of the stand-alone device may be added to the team device list and the stand-alone device may be configured with the team address. To migrate a device from one team to a new team, the device address may be reconfigured with a new address and added to the team device list. To migrate a team device to a stand-alone device, the device may be deleted from a team device list. Configuration of a team and devices within a team may be performed through a single web interface, as described below with reference to FIG. 5.

Figure 2:
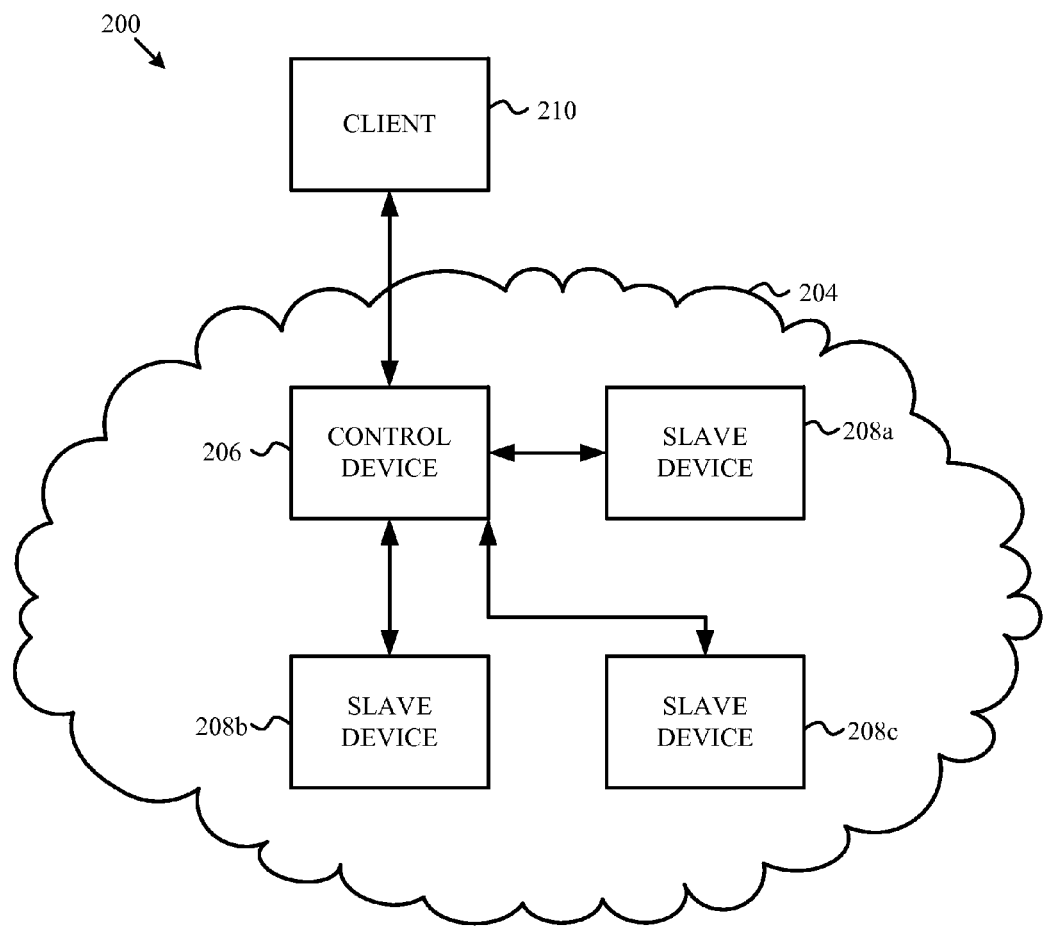
FIG. 2 is a block diagram illustrating a team of devices according to one embodiment of the disclosure.

After control devices and slave devices are initialized and configured according to the method of FIG. 1, the devices may cooperate to serve client devices. FIG. 2 is a block diagram illustrating a team of devices according to one embodiment of the disclosure. A network 200 may include a team 204 having a control device 206 and slave devices 208*a-c*. Although three slave devices 208*a-c* are illustrated, the team 204 may include more or less slave devices.

A client 210 of the team 204 may request dynamic licenses from the team 204. The control device 206 may assign one of the slave devices 208*a-c* to respond to the client 210 with dynamic licenses. Dynamic licensing allows for licenses to be managed electronically by assigning licenses from a license source for temporary use by a client. For example, rather than statically assigning a license to the client 210 on the network 200 during configuration of the client 210, the client 210 may request licenses from the team 204 when the client 210 needs licenses to process data. In different embodiments, the device may be a gateway, a router, a switch, a personal computer, or a mobile device. The client 210 may monitor itself and adjusts the number of licenses requested from the team 204 based upon activity occurring in the client 210. Additional licenses may be requested by sending a request message to an address of the team 204. The team 204 may respond with a message either granting the requested licenses or refusing the requested licenses. If refused, the client 210 may request licenses from another team, or reduce the number of licenses requested and try again. Dynamic licensing allows separation of the license configuration for computer software from the device executing the computer software on the device. Such a configuration provides additional flexibility in the deployment of devices, such as gateways and computers, on a computer network. Although dynamic licensing examples are discussed herein, devices may be teamed to perform other services as well. For example, devices may be teamed to provide improved reliability of data processing, when the devices 206 and 208*a-c* are processing units, or bandwidth availability, when the devices 206 and 208*a-c* are gateways.

According to one embodiment, the slave devices 208*a-c* and the control device 206 may communicate through packet data units over tunnels, such as through the multilevel security tunneling protocol. Each of the slave devices 208a-c and/or the control device 206 may transmit a heartbeat signal as part of other packet data units or as an independent packet data unit through the tunnels. Thus, the control and slave devices may have information regarding other team members. The heartbeat message may include information such as a device's licensing capacity.

The control device 206 may be the only device in the team 204 to respond to messages transmitted to the team address. For example when the client 210 requests a dynamic license from the team 204, the control device 206 may parse the message and assign the request to one of the slave devices 208a-c. The request may be assigned to one of the slave devices 208a-c through the use of load balancing. That is, the slave device 208a-c least loaded may be assigned to respond to the request from the client 210. When one of the slave devices 208a-c is selected by the control device 206, the control device 206 may open a tunnel to the slave device 208a-c and transmit the request for a dynamic license. The selected one of the slave devices 208a-c may respond back to the control device 206, which forwards the response to the client 210.

The control devices 206 may also act as a parser of messages and leave a selected one of the slave devices 208a-c to respond to the messages received at the team address. After the control device 206 forwards the message received at the team address to a selected one of the slave devices 208a-c, a license tunnel may be established between the selected slave device and the client 210.

The client 210 and the selected one of the slave devices 208a-c may transmit a heartbeat message through the license tunnel. According to one embodiment, the period of time between heartbeat messages may be five seconds. However, the period of time may be adjusted. For example, a larger time between heartbeat messages may result in less overhead in transmitting the heartbeat messages but increase the time a dynamic license may remain assigned to the client 210 after either the client 210 or the selected one of the slave devices 208a-c fails.

If the selected one of the slave devices 208a-c fails, the client may detect the failure after a pre-determined period of time, such as three missed heartbeats. After the pre-determined period of time, the client 210 may terminate the license tunnel due to inactivity or the client 210 may shutdown. The next time the client 210 sends data, the license tunnel may be reestablished by requesting a new license tunnel from the team IP address, which causes the control device 206 to select another one of the slave devices 208a-c.

Figure 3:
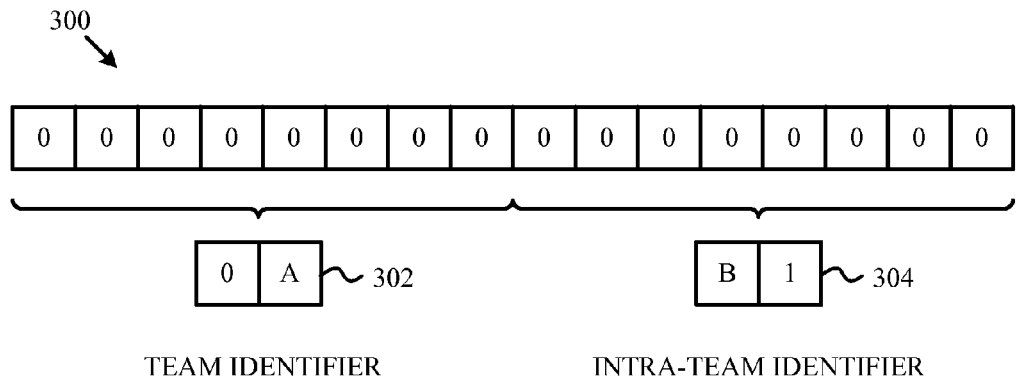
FIG. 3 is a block diagram illustrating an identifier for a device in a team according to one embodiment of the disclosure.

FIG. 3 is a block diagram illustrating an identifier for a device in a team according to one embodiment of the disclosure. A device may identify other teams or members of its team through a team identifier portion 302 of an identifier 300. According to one embodiment, the team identifier portion 302 is an 8-bit value. When the device having the identifier 300 is not assigned to a team, the team identifier portion 302 may take on a null value, such as zero. A device may identify itself separate from other device in the team by an intra-team identifier portion 304. According to one embodiment, the intra-team identifier portion 304 may also be an 8n-bit value. However, the team identifier portion 302 and the intra-team identifier portion 304 need not be the same length. For example, in a network planned with small team sizes, fewer bits may be assigned to the intra-team identifier portion 304 and additional bits assigned to the team identifier portion 302. Further, the total number of bits in the identifier 300 may be varied. By locating the team identifier portion 302 and the intra-team identifier portion 304 in isolated portions of the identifier 300, a team identifier and/or intra-team identifier may be quickly deduced from the identifier 300 by applying a bit mask. However, the team identifier portion 302 and the intra-team identifier portion 304 may also be interleaved in certain embodiments.

Figure 4:
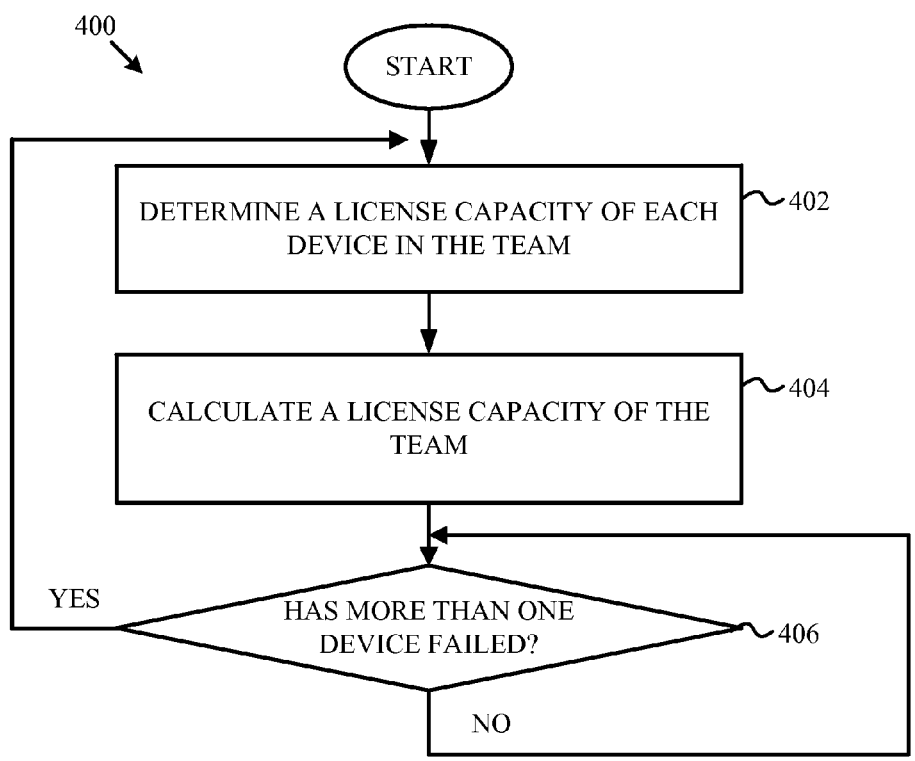
FIG. 4 is a flow chart illustrating a method for determining a license capacity of a team according to one embodiment of the disclosure.

The license capacity of a team may be calculated by a control device in the team. FIG. 4 is a flow chart illustrating a method for determining a license capacity of a team according to one embodiment of the disclosure. A method 400 begins at block 402 with determining a license capacity of each device in the team, such as the control device 206 and the slave devices 208a-c of FIG. 2. The license capacity of devices in the team may be determined by accumulating heartbeat messages from each of the devices. The license capacity of each device may also be explicitly queried by the control device. According to different embodiments, devices may have, for example, 10, 50, 100, or 400 dynamic licenses available. The individual license capacity of devices in the team may be identical, similar, or different. For example, all devices in a team may have the same license capacity or devices may have different license capacities.

At block 404, the license capacity of the team is calculated from the determined license capacity of each device at block 402. The capacity of the team may be calculated as the sum of the individual device capacities reduced by one device's capacity. By reducing the total capacity by one device's capacity, the team capacity may still be met when one device in the team fails.

According to one embodiment, the reduction of one device's capacity may be the largest capacity of the devices. For example, if three devices each with a license capacity of 50 are members of a team, then the total license capacity for the team may be 100. If a device in the team fails, the remaining team members may still provide 100 licenses. In another example, if three devices with license capacities of 10, 10, and 100 are members of a team, then the total team capacity may be 20 licenses. Even if the device with a capacity of 100 fails, the team may continue to operate without a change in configuration of total capacity of licenses.

According to one embodiment, the reduction of the team capacity by one device's capacity may allow the control device to not respond to individual license requests. Instead, the control device may perform administration of the team and forwarding of requests received at the team IP address to slave devices. When one of the slave devices fails, the control device may load balance additional requests to the remaining slave devices. When the capacity of the remaining slave devices is reached, the control device may begin to respond to license requests itself by establishing licensing tunnels to clients.

At block 406, the control device determines whether more than one device in the team has failed. If not, the control device continues to wait at block 406. The control device may determine that more than one device has failed based on parsing and analyzing heartbeat messages received from the slave devices. For example, if a heartbeat message from a slave device is absent for a predetermined period of time, the slave device may be determined to have failed. Failure of a device may be due to a hardware failure, software failure, network cable disconnection, or shutdown. When heartbeat messages for more than one slave device are absent, the control device may return to block 402 to recalculate the license capacity of the team by first determining the license capacity of each remaining device in the team.

If one failed device is detected at block 406, the control device may avoid recalculating the capacity of the team because the team capacity was already calculated as the sum of the devices less one device's capacity. If one device fails, restarts, and rejoins the team, the license capacity of the team may remain the same. Thus, the reconfiguration of devices when devices fail is reduced or eliminated.

In one example of recalculating the team capacity after a failure of more than one device, a team of four devices with capacities of 100 licenses each may have a team capacity of 300 licenses. If two of the devices fail, then the team capacity may be reduced to 200 licenses. In another example, a team of four devices with capacities of 50, 50, 100, and 100 may have a team capacity of 200 licenses. If the devices with capacity of 50 and 50 fail, then the team capacity remains 200 licenses. If devices with capacity of 50 and 100 fail, then the team capacity reduces to 150 licenses. If the devices with capacity of 100 and 100 fail, then the team capacity reduces to 100 licenses. In yet another example, a team of four devices with capacities of 50, 100, 400, and 400 may have a team capacity of 550 licenses. If the devices with capacity of 50 and 100 fail, then the team capacity remains at 550 licenses. If the devices with capacity of 400 and 400 fail, then the team capacity reduces to 150 licenses. If the devices with capacity of 50 and 400 fail, then the team capacity reduces to 500 licenses.

Figure 5:
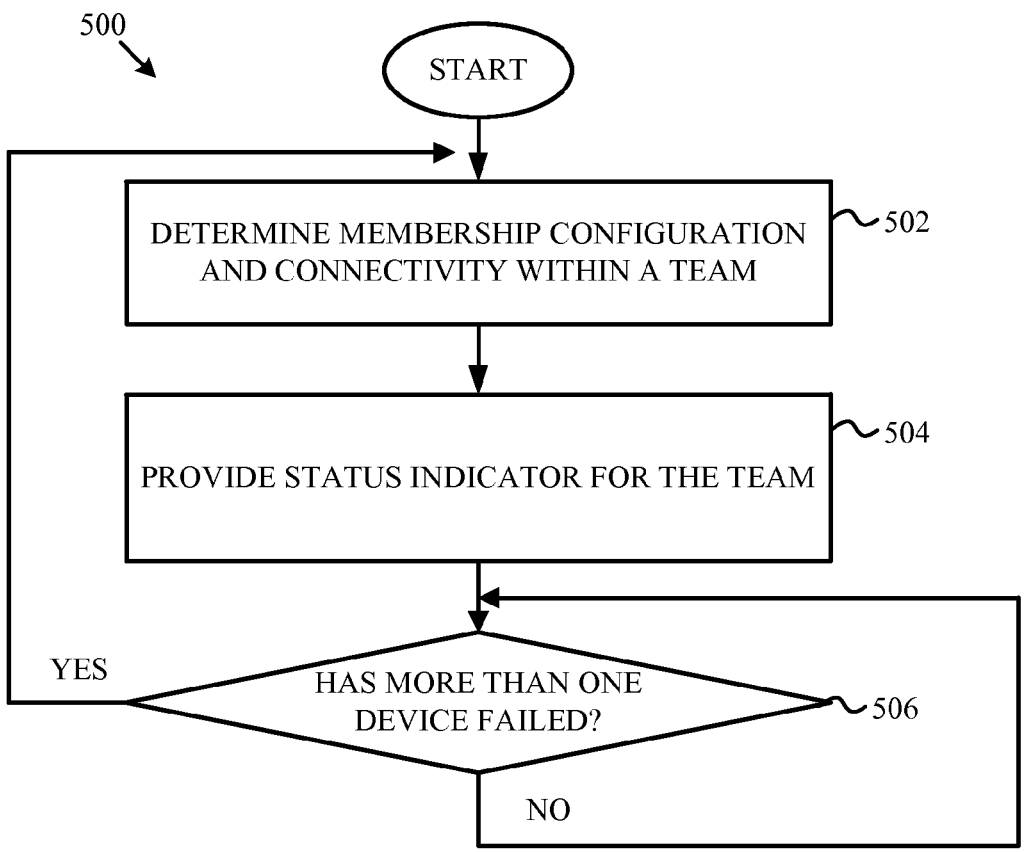
FIG. 5 is a flow chart illustrating team configuring during device failure according to one embodiment of the disclosure.

FIG. 5 is a flow chart illustrating team configuring during device failure according to one embodiment of the disclosure. A method 500 begins at block 502 with a master device of a team determining membership configuration and connectivity, of both passed and unparsed communications, for each device in the team. At block 504, the master device may provide a status indicator reporting operational capabilities for the team. The status indicator may include a physical appliance status, a passed network communication status, and/or an unparsed network communication status. The status indicator may be displayed in a single user interface that allows control over multiple devices, such as described below in FIG. 6. At block 506, the master device determines whether more than one device has failed. The device may determine more than one device has failed by monitoring physical network interface connection (NIC) failure and/or disconnection. If so, the method 500 returns to block 502 to determine the membership configuration and connectivity of the team. If no, the method 500 loops at block 506 until more than one device has failed. According to one embodiment, a device may not be determined as failed if failover occurs and another device takes the place of the failed device.

Figure 6:
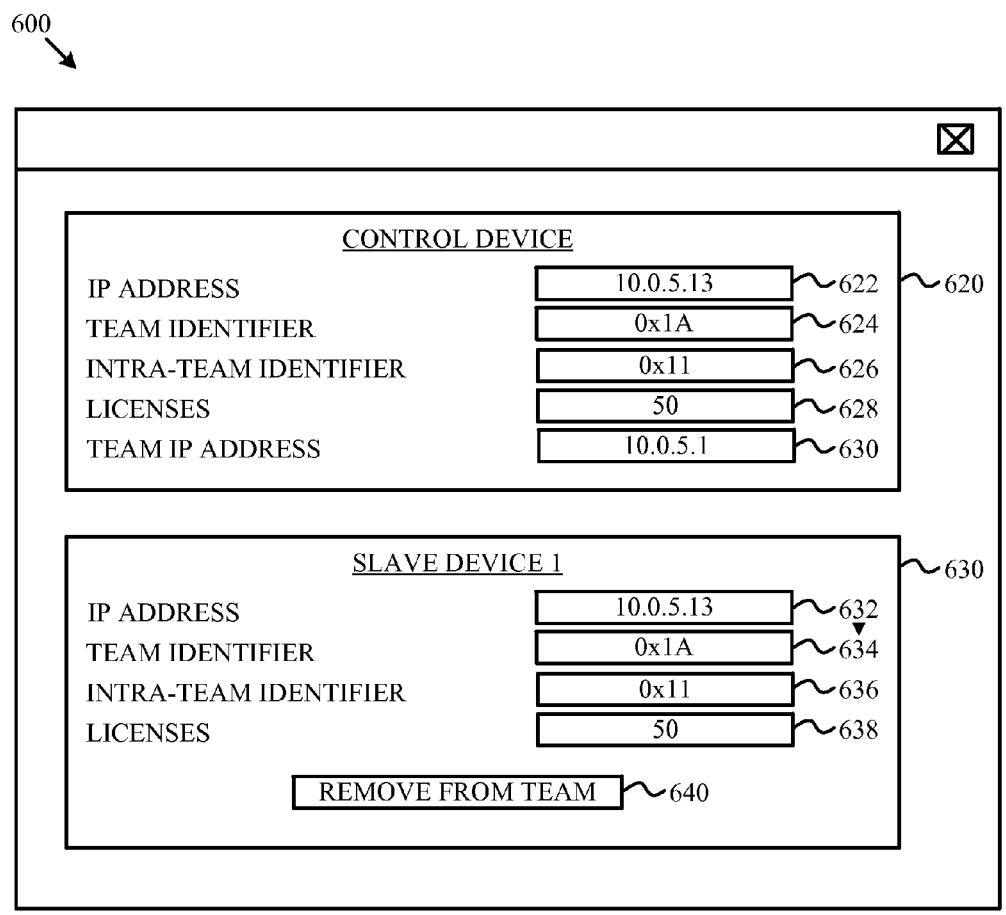
FIG. 6 is a display illustrating a user interface for configuring devices in a team from a single control panel according to one embodiment of the disclosure.

FIG. 6 is a display illustrating a user interface for configuring devices in a team from a single control panel according to one embodiment of the disclosure. A display 600 displays a user interface for managing devices in a team. A single user interface may be used to configure multiple devices. The user interface may be accessed through the control device of the team. For example, the control device may host a web server, such as a hypertext transfer protocol (HTTP) server. The HTTP server of the control device may communicate information in the display 600 to administrators through a web service protocol, such as a simple object access protocol (SOAP).

The display 600 may include configuration details 620 for a control device and configuration details 630 for a slave device. Although only one slave device is shown on the display 600, the display 600 may include the display of configuration details for multiple slave devices. Additionally, scripts may be executed in the display 600 to similarly configure multiple slave devices without setting configuration details for each slave device individually.

Configuration details 620 for a control device may include an IP address 622 for the device. As described above, the device IP address 622 may be used to communicate individually with the control device. The details 620 may also include a team IP address 610. The team IP address 610 may be used by clients to transmit messages to the team. The control device may also be configured with a team identifier 624 and an intra-team identifier 626. Further, the control device may be configured with a maximum number of licenses 628.

Configuration details 630 for a slave device may be similar to the configuration details 620 for the control device. In an embodiment where the slave device has a different hardware configuration than the control device, the configuration details 630 may differ more for the slave device from the control device than shown in the display 600. For example, if the slave device has multiple processors, a different number of licenses may be configured for each processor. The configuration details 620 may include an IP address 632 for establishing direct communications to the slave device, a team identifier 634, an intra-team identifier 636, and a maximum number of licenses 638. Control devices may also be removed from a team by clicking a button 640 on the display 600.

According to one embodiment, the display 600 may also configuration of policies and/or scheduling for deleting and/or storing system logs in each of the master or slave devices in the team. Additionally, system logs for each of the devices may be viewed through the display 600.

Figure 7:
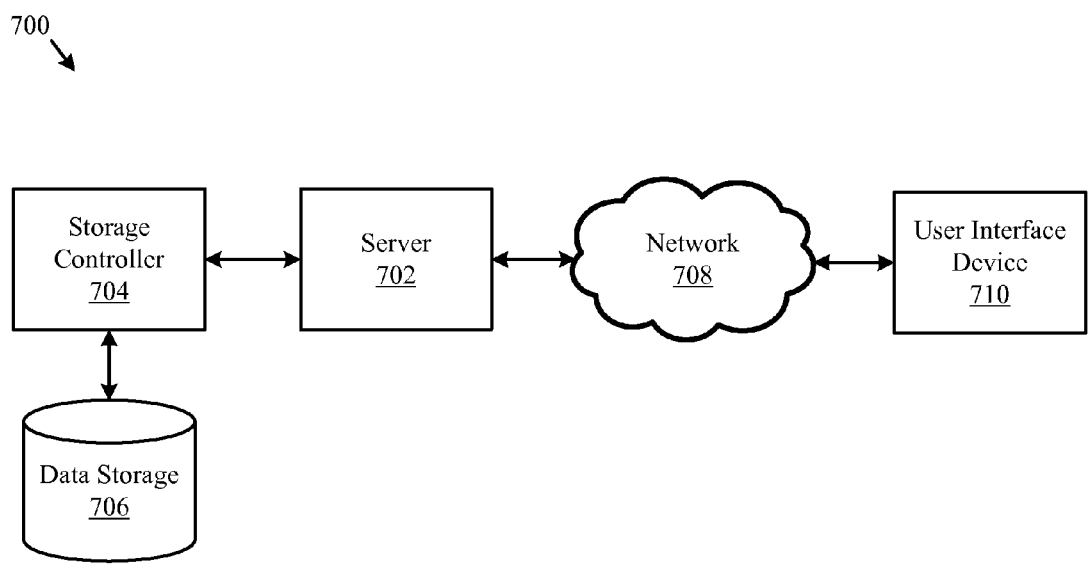
FIG. 7 is a block diagram illustrating a computer network according to one embodiment of the disclosure.

FIG. 7 illustrates one embodiment of a system 700 for an information system, including teamed devices. The system 700 may include a server 702, a data storage device 706, a network 708, and a user interface device 710. The server 702 may be a dedicated server or one server in a cloud computing system. The server 702 may also be a hypervisor-based system executing one or more guest partitions. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708. The data storage device 706 may represent a team of data storage devices organized and operating as described above with reference to FIGS. 1-6. Likewise, the server 708 may represent a team of servers.

In one embodiment, the user interface device 710 is referred to broadly and is intended to encompass a suitable processor-based device such as a desktop computer, a laptop computer, a personal digital assistant (PDA) or tablet computer, a smartphone or other a mobile communication device having access to the network 708. The user interface device 710 may be used to access a web service executing on the server 702. When the device 710 is a mobile device, sensors (not shown), such as a camera or accelerometer, may be embedded in the device 710. When the device 710 is a desktop computer the sensors may be embedded in an attachment (not shown) to the device 710. In a further embodiment, the user interface device 710 may access the Internet or other wide area or local area network to access a web application or web service hosted by the server 702 and provide a user interface for enabling a user to enter or receive information.

The network 708 may facilitate communications of data, such as dynamic license request messages, between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 710 accesses the server 702 through an intermediate server (not shown). For example, in a cloud application the user interface device 710 may access an application server. The application server may fulfill requests from the user interface device 710 by accessing a database management system (DBMS). In this embodiment, the user interface device 710 may be a computer or phone executing a Java application making requests to a JBOSS server executing on a Linux server, which fulfills the requests by accessing a relational database management system (RDMS) on a mainframe server.

Figure 8:
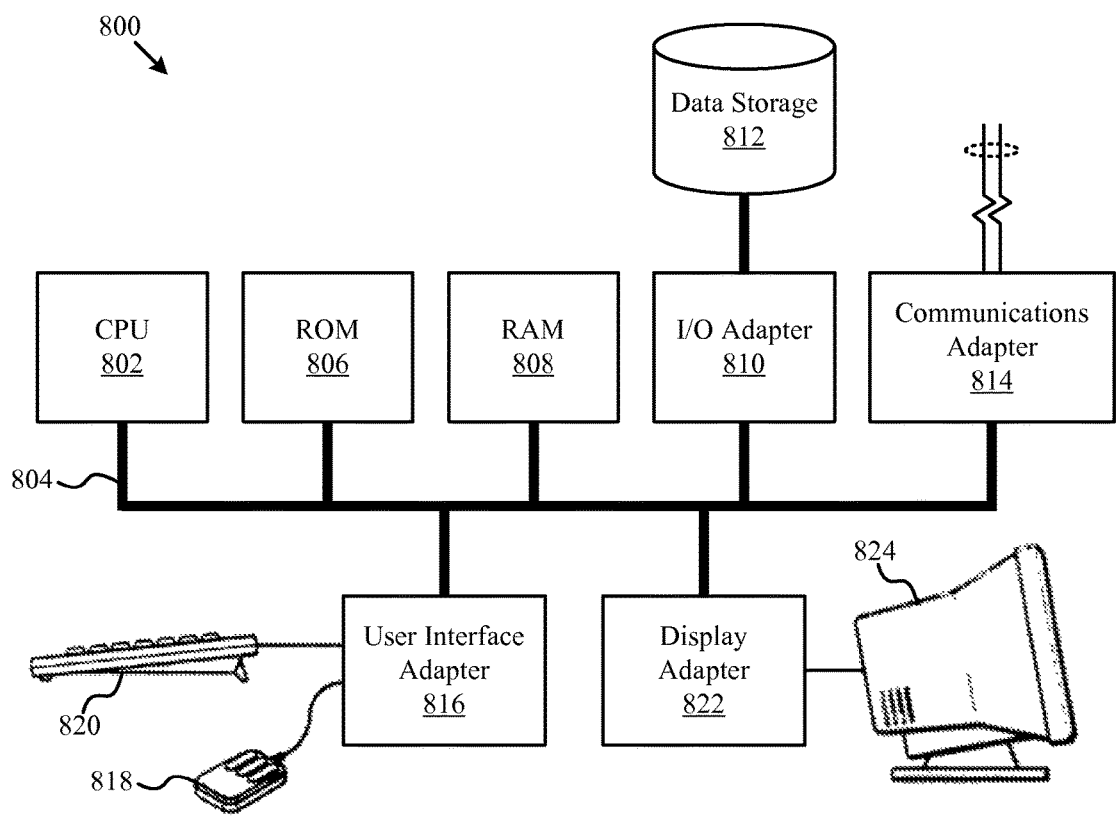
FIG. 8 is a block diagram illustrating a computer system according to one embodiment of the disclosure.

FIG. 8 illustrates a computer system 800 adapted according to certain embodiments of the server 702 and/or the user interface device 710. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 9A:
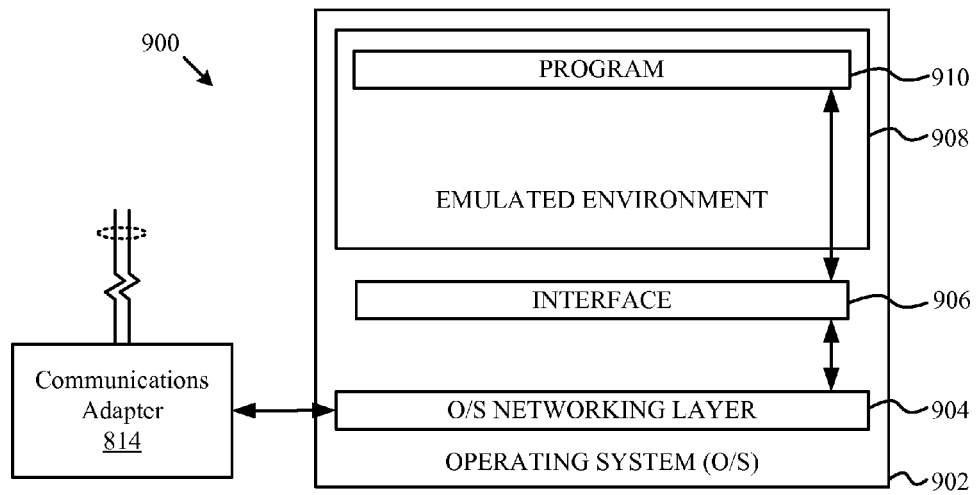
FIG. 9A is a block diagram illustrating a server hosting an emulated software environment for virtualization according to one embodiment of the disclosure.

FIG. 9A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 9B:
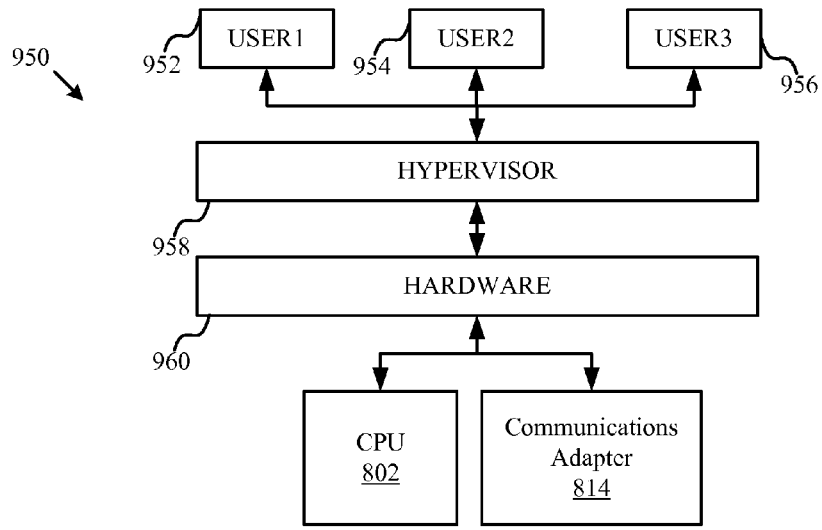
FIG. 9B is a block diagram illustrating a server hosting an emulated hardware environment according to one embodiment of the disclosure.

In another example, hardware in a computer system may be virtualized through a hypervisor. FIG. 9B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   initializing, by a device with an assigned team identifier, communication on a network;
   searching, by the device, for at least one other team device on the network with the shared team identifier;
   assuming control, by the device, as the team's control device if the device has the highest assigned priority, wherein the control device is configured to be the only device within the team that communicates with a client, the control device is configured not to provide any dynamic license itself, the control device is further configured to:
   receive, at a team address, at least one message from the client, in which the at least one message includes a request for a dynamic license, wherein the dynamic license allows a number of requested licenses to be adjusted by the client,
   parse the at least one message received from the client,
   assign a team device, using the team device's device address, to provide the dynamic license, and
   pass on the dynamic license provided by the team device;
   wherein the team identifier comprises a team identifier portion and an intra team identifier portion; the team identifier portion being utilized to identify devices that are members of a same team, and the intra-team identifier portion being utilized to identify itself separate from other device in the team.

2. The method of claim 1, further comprising transmitting a heartbeat to the team having a license capacity of the device.

3. The method of claim 1, further comprising, when the device is the control device, determining a license capacity of the team.

4. The method of claim 3, in which the license capacity is determined by calculating a license capacity of the team when one device of the team fails.

5. The method of claim 1, in which the step of assign a team device comprises load balancing by distributing the messages received at the team address to team devices.

6. The method of claim 1, further comprising, when the device is the control device, administering other team devices from a user interface of the control device.

7. A computer program product, comprising:
   a non-transitory computer readable medium comprising:
   code to initialize, by a device with an assigned team identifier, communication on a network;
   code to search, by the device, for at least one other device on the network with the shared team identifier;
   code to, assume control, by the device, as the team's control device if the device has the highest assigned priority, wherein the device is configured to be the only device within the team that communicates with a client, the device is configured not to provide any dynamic license itself, the device is further configured to:
   receive, at a team address, at least one message from the client, in which the at least one message includes a request for a dynamic license, wherein the dynamic license allows a number of requested licenses to be adjusted by the client,
   parse the at least one message received from the client,
   assign a team device, using the team device's device address, to provide the dynamic license, and
   pass on the dynamic license provided by the team device;
   wherein the team identifier comprises a team identifier portion and an intra-team identifier portion; the team identifier portion being utilized, to identify devices that are members of a same team, and the intra-team identifier portion being utilized to identify itself separate from other device in the team.

8. The computer program product of claim 7, in which the medium further comprises code to transmit a heartbeat to the team having a license capacity of the device.

9. The computer program product of claim 7, in which the medium further comprises code to, when the device is the control device, determine a license capacity of the team.

10. The computer program product of claim 9, in which the medium further comprises code to calculate a license capacity of the team when one device of the team fails.

11. The computer program product of claim 7, in which the medium further comprises code to load balance by distributing the messages received at the team address to team members.

12. The computer program product of claim 7, in which the medium further comprises code to when the device is the control device, administer other team devices from a user interface of the control device.

13. An apparatus, comprising:
   a memory configured to store a team identifier for assigning the apparatus to a team;
   a network interface; and
   a processor coupled to the memory and to the network interface, in which the processor is configured:
   to initialize communication on a network through the network interface;
   to search for at least one other device on the network having the team identifier;
   to assume control such that the apparatus is the team's control device if the processor has the highest assigned priority, wherein the control device is configured to be the only device within the team that communicates with a client, the control device is configured not to provide license itself, the control device is further configured to:
receive, at a team address, at least one message from the client, in which the at least one message includes a request for a dynamic license, wherein the dynamic license allows a number of requested licenses to be adjusted by the client,
parse the at least one message received from the client,
assign a team device, using the team device's device address, to provide the dynamic license, and
pass on the dynamic license provided by the team device;
wherein the team identifier comprises a team identifier portion and an intra-team identifier portion; the team identifier portion being utilized to identify devices that are members of a same team, and the intra-team identifier portion being utilized to identify itself separate from other device in the team.

14. The apparatus of claim 13, in which the processor is further configured to transmit a heartbeat through the network interface to the team having a license capacity of the device.

15. The apparatus of claim 13, in which the processor is further configured to, when the device is the control device, determine a license capacity of the team.

16. The apparatus of claim 13, in which the processor is further configured to load balance by distributing the messages received at the team address to team devices.

17. The apparatus of claim 13, in which the processor is further configured to present a user interface to configure team devices.

18. The method of claim 1, in which the team's control device is further configured to: receive dynamic license requests from the at least one other team device if the at least one other team device does not have an available dynamic license.

* * * * *